(12) United States Patent
Jajodia et al.

(10) Patent No.: US 9,325,729 B2
(45) Date of Patent: *Apr. 26, 2016

(54) K-ZERO DAY SAFETY

(71) Applicants: George Mason Research Foundation, Inc., Fairfax, VA (US); The United States of America, as represented by the Secretary of Commerce, The National Institute of Standards and Technology, Washington, DC (US)

(72) Inventors: Sushil Jajodia, Oakton, VA (US); Lingyu Wang, Montreal (CA); Steven Noel, Woodbridge, VA (US); Anoop Singhal, Germantown, MD (US)

(73) Assignees: George Mason Research Foundation, Inc., Fairfax, VA (US); The United States of America, as represented by the Secretary of Commerce, The National Institute of Standards and Technology, Washington, DC (US)

( * ) Notice: Subject to any disclaimer, the term of this patent is extended or adjusted under 35 U.S.C. 154(b) by 13 days.

This patent is subject to a terminal disclaimer.

(21) Appl. No.: 14/324,966

(22) Filed: Jul. 7, 2014

(65) Prior Publication Data
US 2014/0325660 A1 Oct. 30, 2014

Related U.S. Application Data

(63) Continuation of application No. 13/348,457, filed on Jan. 11, 2012, now Pat. No. 8,918,884.

(60) Provisional application No. 61/431,535, filed on Jan. 11, 2011.

(51) Int. Cl.
*H04L 29/06* (2006.01)
*G06F 21/57* (2013.01)

(52) U.S. Cl.
CPC .......... *H04L 63/1433* (2013.01); *G06F 21/577* (2013.01)

(58) Field of Classification Search
CPC ......... G06F 21/55; G06F 21/56; G06F 21/57; G06F 21/554; G06F 21/562; G06F 21/577; H04L 63/1416; H04L 63/1425; H04L 63/1433
USPC ............................................. 726/23, 24, 25
See application file for complete search history.

(56) References Cited

U.S. PATENT DOCUMENTS

2009/0077666 A1 3/2009 Chen

OTHER PUBLICATIONS

E.W. Dijkstra. A Note on Two Problems in Connexion with Graphs. *Numerische Mathematik*, 1:269271, pp. 269-271, 1959.

(Continued)

*Primary Examiner* — Kambiz Zand
*Assistant Examiner* — Noura Zoubair
(74) *Attorney, Agent, or Firm* — Eckert Seamans Cherin & Mellott, LLC; Philip E. Levy

(57) ABSTRACT

Systems and methods for determining a safety level of a network vulnerable to attack from at least one origin to at least one target are described. Machines, components, and vulnerabilities in a network may be associated to one another. Degrees of similarity among the vulnerabilities may be determined and subsets of vulnerabilities may be grouped based on their determined degrees of similarity to one another. This data may be used to generate an attack graph describing exploitation of vulnerabilities and grouped vulnerabilities and defining vulnerability exploit condition relationships between at least one origin and at least one target. The attack graph may be analyzed using a k-zero day metric function to determine a safety level.

18 Claims, 10 Drawing Sheets

(56) References Cited

OTHER PUBLICATIONS

J. Pamula, P. Ammann, S. Jajodia, V. Swarup. A Weakest-Adversary Security Metric for Network Configuration Security Analysis. *Proceedings of the 2nd ACM Workshop on Quality of Protection*, pp. 31-37, New York, NY, 2006. ACM Press.
T. Beth, M. Borcherding, and B. Klein. Valuation of Trust in Open Networks. *Proceedings of the Third European Symposium on Research in Computer Security (ESORICS '94)*, pp. 3-18, 1994.
J.W.P. Manadhata. An Attack Surface Metric. *First Workshop on Security Metrics (MetriCon)*, 2006.
An Attack Surface Metric. J.W.P. Manadhata. Technical Report CMU-CS-05-155, p. 1-22. Jul. 2005.
D. Balzarotti, M. Monga, S. Sicari. Assessing the Risk of Using Vulnerable Components. *Proceedings of the 1st Workshop on Quality of Protection*, 2005.
Metric. L. Wang, T. Islam, T. Long, A. Singhal, and S. Jajodia. An attack-Graphed Based Probabilistic Security. *Proceedings of the 22nd Annual IFIP WG 11.3 Working Conference on Data and Applications Security (DBSec '08)*, 2008.
M.K. Reiter and S.G. Stubblebine. Authentication Metric Analysis and Design. *ACM Transactions on Information and System Security*, vol. 2, No. 2, pp. 138-158, May 1999.
O. Sheyner, J. Haines, S. Jha, R. Lippmann, and J. Wing. Automated Generation and Analysis of Attack Graphs. *Proceedings of the 2002 IEEE Symposium on Security and Privacy (S&P'02)*, 2002.
R. Chandramoull, T. Grance, R. Kuhn, S. Landau. Common Vulnerability Scoring System. *IEEE Computer Society*, 1540-7993/06.
L.P. Swiler, D. Ellis, and S. Chakerian. Computer-Attack Graph Generation Tool. *Proceedings of the DARPA Information Survivability Conference & Exposition II (DIS-CEX '01)*, 2001.
B.-G. Chun, P. Maniatis, S. Shenker. Diverse Replication for Single-Machine Byzantine-Fault Tolerance, *ATC '08: USENIX 2008 Annual Technical Conference on Annual Technical Conference*, pp. 287-292, Berkeley, CA, USA, 2008. USENIX Association.
S. Noel, S. Jajodia, B. O'Berry, and M. Jacobs. Efficient Minimum-Cost Network Hardening Via Exploit Dependency Graphs. *Proceedings of the 19th Annual Computer Security Applications Conference (ACSAC 2003)*, 2003.
M. A. McQueen, T. A. McQueen, W.F. Boyer, M.R. Chaffin. Empirical Estimates and Observations of 0 Day Vulnerabilities. *Hawaii International Conference on System Sciences*, p. 1-12, Jan. 2009.
D.J. Leversage and E. James. Estimating a System's Mean Time-to-Compromise. *IEEE Security Security and Privacy*, vol. 6, No. 6, pp. 52-60, 2008.
R. Ortalo, Y. Deswarte, and M. Kaaniche. Experimenting with Quantitative Evaluation Tools for Monitoring Operational Security. *IEEE Transactions on Software Engineering*, vol. 25, No. 5, pp. 633-650, Sep./Oct. 1999.
C. Phillips and L. Swiler, Laura. A Graph-Based System for Network-Vulnerability Analysis. *Proceedings of the New Security Paradigms Workshop (NSPW '98)*, 1998.
K.J. Soo Hoo. Working Paper How Much Is Enough? *A Risk-Management Approach to Computer Security*. Jun. 2000.
W. Lee and D. Xiang. Information-Theoretic Measures for Anomaly Detection. *Proceedings of the 2001 IEEE Symposium on Security and Privacy*, p. 130, Washington, DC 2001. IEEE Computer Society.
J.W.P. Manadhata. Measuring a System's Attack Surface. Technical Report CMU-CS-04-102. Jan. 2004.
T. Holz, C. Gorecki, K. Rieck, F.C. Freiling. Measuring and Detecting Fast-Flux Service Networks. *Annual Network and Distributed System Security Symposium*, 2008.
M. Frigault, L. Wang, A. Singhal, and S. Jajodia. Measuring Network Security Using Dynamic Bayesian Network. *Proceedings of ACM Workshop on Quality of Protection (QoP '08)*, 2008.
L. Wang, A. Singhal and S. Jajodia. Measuring Network Security Using Attack Graphs. *Proceedings of the 3rd ACM Workshop on Quality of Protection (QoP '07)*, New York, NY, Oct. 29, 2007. ACM Press.
L. Wang, S. Jajodia, and A. Singhal. Measuring the Overall Security of Network Configurations Using Attack Graphs. *Proceedings of 21st IFIP WG 11.3 Working Conference on Data and Applications Security (DBSec '07)*, 2007.
M. Howard, J. Pincus, and J.M. Wing. Measuring Relative Attack Surfaces. *Workshop on Advanced Developments in Software and Systems Security*, 2003.
P. Manadhata, J. Wing, M. Flynn, and M. McQueen. Measuring the Attack Surfaces of Two FTP Daemons. *ACM Workshop on Quality of Protection*, 2006.
R.E. Newman, I.S. Moskowitz, P. Syverson and S. Andrei. Metrics for Traffic Analysis Prevention. *Privacy Enhancing Technologies*, pp. 48-65, 2003.
L. Wang, S. Noel, and S. Jajodia. Minimum-Cost Network Hardening Using Attack Graphs. *Computer Communications*, vol. 29, No. 18, pp. 3812-3824, Nov. 2006.
K. Ingols, M. Chu, R. Lippmann, S. Webster, and S. Boyer. Modeling Modern Network Attacks and Countermeasures Using Attack Graphs. *ACSAC '09: Proceedings of the 2009 Annual Computer Security Applications Conference*, p. 117-126, Washington, DC, 2009. IEEE Computer Society.
D. Zerkle and K. Levitt. NetKuang—A Multi-Host Configuration Vulnerability Checker. *Proceedings of the Sixth USENIX UNIX Security Symposium (USENIX '96)*, 1996.
M. Reiter, S.G. Stubblebine. Toward Acceptable Metrics of Authentication. *Proceedings of the 1997 IEEE Symposium on Security and Privacy*, p. 10, 1997. IEEE Computer Society.
E. Chew, M. Swanson, K. Stine, N. Bartol, A. Brown and W. Robinson. Performance Measurement Guide for Information Security. Jul. 2008.
J. Ryan and D.J. Ryan. Performance Metrics for Information Security Risk Management. *IEEE Security and Privacy*, vol. 6, No. 5, p. 38-44, 2008.
M. Castro and B. Liskov. Practical Byzantine Fault Tolerance and Proactive Recovery. *ACM Transactions on Computer Systems*, vol. 20, No. 4, pp. 398-461, Nov. 2002.
P. Samarati. Protecting Respondents' Identities in Microdata Release. *IEEE Transactions on Knowledge and Data Engineering*, vol. 13, No. 6, pp. 1010-1027, Nov./Dec. 2001.
J. McHugh. Quality of Protection: Measuring the Unmeasurable? *Proceedings of the 2nd ACM Workshop on Quality of Protection (QoP '06)*, pp. 1-2, 2006.
M. Dacier, Y. Deswarte and M. Kaaniche. Quantitative Assessment of Operational Security: Models and Tools. *LAAS Research Report 96493*, May 1996.
P. Ammann, D. Wijesekera, and S. Kaushik. Scalable, Graph-Based Network Vulnerability Analysis. *Proceeding of the 9th ACM Conference on Computer and Communications Security (CCS '02)*, 2002.
S. Foley. Security Risk Management using Internal Controls. *WISG'09: Proceedings of the first ACM workshop on Information Security Governance* pp. 59-64, Chicago, Illinois, Nov. 13, 2009.
D. Farmer and E. Spafford. The COPS Security Checker System. *Computer Science Technical Reports*, Report No. 90-993.
G. Gu, P. Fogla, D. Dagon, W. Lee, and B. Skoric. Towards an Information-Theoretic Framework for Analyzing Intrusion Detection Systems. *European Symposium on Research in Computer Security*, pp. 537-546, 2006.
R.W. Ritchey and P. Ammann. Using Model Checking to Analyze Network Vulnerabilities. *Proceedings of the 2000 IEEE Symposium on Security and Privacy*, p. 156-165, 2000.
Applied Computer Security Associates (A.S.C. Associates). Workshop on *Information Security System Scoring and Ranking*, 2001.
J. Doob. *Measure Theory*. Springer-Verlag, 1994.
P. Mell, K. Scarfone, and S. Romanosky. *Common vulnerability scoring system*. IEEE Security & Privacy Magazine, 4(6):85-89, 2006.
M. Swanson, N. Bartol, J. Sabato, J. Hash, and L. Graffo. *Security metrics guide for information technology systems*. NIST Special Publication 800-55, 2003.
U.S. Appl. No. 13/348,457.

400

| | $(v_{iptables},0,1)$ | $(v_{http},0,1)$ | $(v_{ssh},0,1)$ | $(v_{root},1,1)$ | $(v_{ssh},1,2)$ | $(v_{firewall},0,F)$ | $(v_{ssh},0,2)$ | $(v_{root},2,2)$ |
|---|---|---|---|---|---|---|---|---|
| $(v_{iptables},0,1)$ | 1 | 0 | 0 | 0 | 0 | 0 | 0 | 0 |
| $(v_{http},0,1)$ | 0 | 1 | 0 | 1 | 0 | 0 | 0 | 0 |
| $(v_{ssh},0,1)$ | 0 | 0 | 1 | 1 | 1 | 0 | 1 | 0 |
| $(v_{root},1,1)$ | 0 | 1 | 1 | 1 | 0 | 0 | 0 | 0 |
| $(v_{ssh},1,2)$ | 0 | 0 | 1 | 0 | 1 | 0 | 1 | 1 |
| $(v_{firewall},0,F)$ | 0 | 0 | 0 | 0 | 0 | 1 | 0 | 0 |
| $(v_{ssh},0,2)$ | 0 | 0 | 1 | 0 | 1 | 0 | 1 | 1 |
| $(v_{root},2,2)$ | 0 | 0 | 0 | 0 | 1 | 0 | 1 | 1 |

K-ZERO DAY SAFETY

CROSS REFERENCE TO RELATED APPLICATIONS

This application is a continuation of U.S. application Ser. No. 13/348,457, filed Jan. 11, 2012. U.S. application Ser. No. 13/348,457 claims priority from U.S. Provisional App. Ser. No. 61/431,535, entitled "k-Zero Day Safety," filed Jan. 11, 2011. The entirety of both of the above-listed applications are incorporated herein by reference.

This invention was made with government support from the National Institute of Standards and Technology under grant 60NANB9D9192. The government has certain rights in the invention.

BRIEF DESCRIPTIONS OF THE DRAWINGS

FIG. 5 depicts a relation table according to an embodiment of the invention.

DETAILED DESCRIPTION OF SEVERAL EMBODIMENTS

Figure 1:
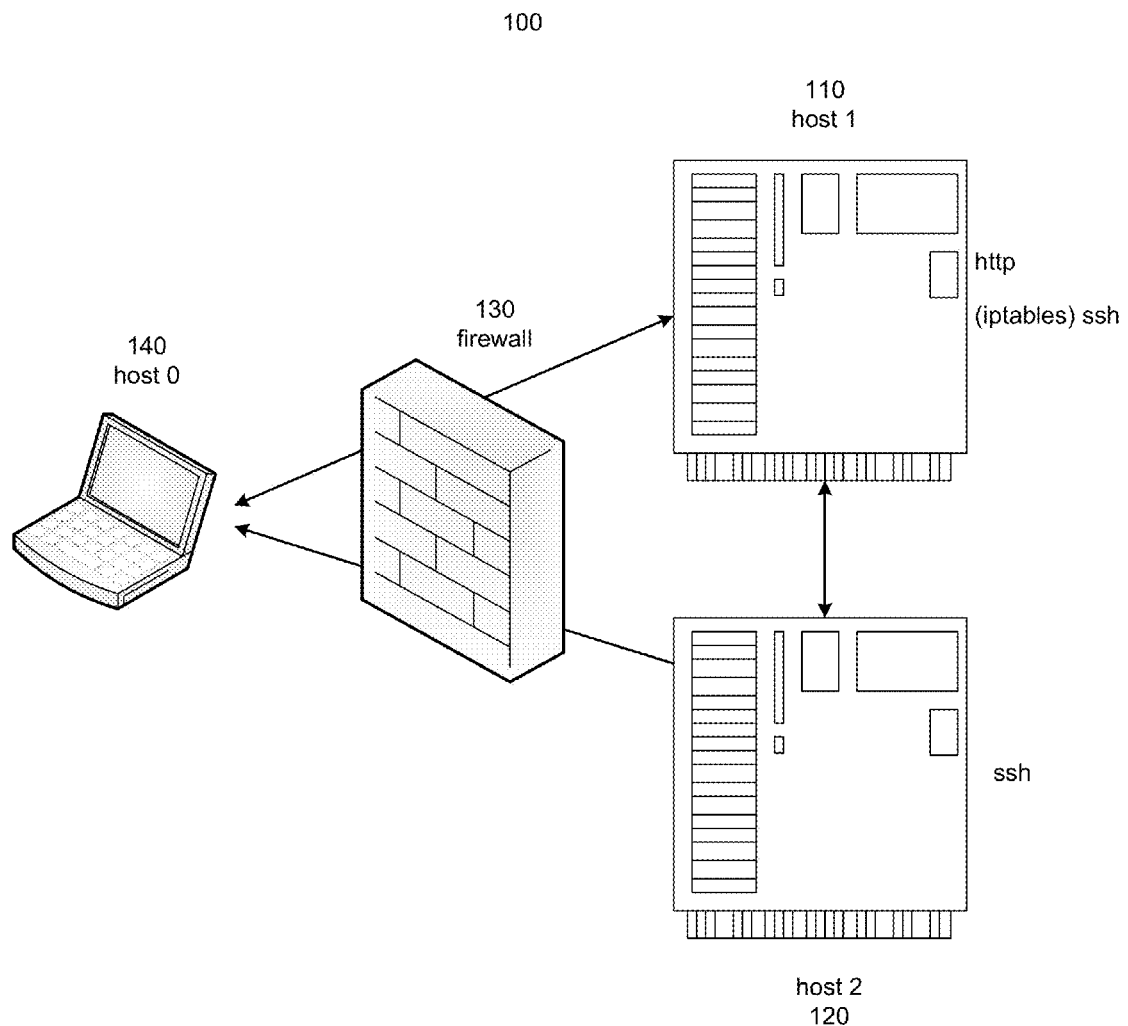
FIG. 1 depicts a network according to an embodiment of the invention.

Systems and methods for analyzing network vulnerabilities are presented. Network vulnerability analyses described herein may determine k-zero day safety for network and/or computer systems. For example, a network may be monitored, analyzed, and modeled. The network model may in turn be analyzed to determine how many unknown vulnerabilities may be required to compromise a network asset, regardless of what vulnerabilities those are. The determination may be used for hardening the network.

Computers may be linked to one another via a network or networks. A computer may be any programmable machine capable of performing arithmetic and/or logical operations. In some embodiments, computers may comprise processors, memories, data storage devices, and/or other commonly known or novel components. These components may be connected physically or through network or wireless links. Computers may also comprise software which may direct the operations of the aforementioned components. Computers may be referred to with terms that are commonly used by those of ordinary skill in the relevant arts, such as machines, servers, PCs, mobile devices, and other terms. It will be understood by those of ordinary skill that those terms used herein are interchangeable, and any computer capable of performing the described functions may be used. A network may be any plurality of completely or partially interconnected computers wherein some or all of the computers are able to communicate with one another. It will be understood by those of ordinary skill that connections between computers may be wired in some cases (i.e. via wired TCP connection or other connection) or may be wireless (i.e. via WiFi connection). Any connection through which at least two computers may exchange data can be the basis of a network. In some cases, a network may be a cloud network wherein computation, software, data access, storage, and/or other services may be provided to end user computers from servers distributed throughout the Internet or some other network.

Computers and networks may be vulnerable to outside intrusion. Network operators may wish to secure networks against potential intrusion and/or evaluate likelihoods and/or sources of potential intrusion. As part of this process, present network security may be measured, and analysis may be performed to determine how network security may change if new security measures are introduced or if network configuration is modified. Metrics measured and analyzed by the systems and methods described below may determine how many distinct zero day vulnerabilities a network can resist and/or whether a network can resist a specific number of zero day vulnerabilities. A zero day vulnerability is a vulnerability whose details are unknown except that it satisfies at least the following two conditions. (Conditions may exist which may be prerequisites for exploiting vulnerabilities of network components and/or may be results of actually exploiting vulnerabilities of network components.) The first condition is that the vulnerability cannot be exploited unless a network connection exists between the source and destination hosts, a remote service with the vulnerability exists on the destination host, and the attacker already has a privilege on the source host. The second condition is that exploitation of the vulnerability can potentially yield any privilege on the destination host. Any element of a computer and/or network which may be vulnerable to an attack can be considered a component that is evaluated as described herein. A component (or asset) may be any unit of computational processing that can contribute to a network attack vulnerability, such as software employed by any piece of hardware on the network. Some components may be assets that may be specific, incidental, or intermediate targets of attack.

A k-zero day metric may be determined for a network to evaluate how many distinct zero day attacks may be required to breach the network. A larger k-zero day metric number may indicate a relatively more secure network, since the likelihood of having more distinct unknown vulnerabilities all available at the same time, applicable to the same network, and exploitable by the same attacker, may be lower. A zero day vulnerability as defined above may represent a worst-case scenario about the pre- and post-conditions of exploiting a vulnerability. A particular zero day vulnerability may in reality require stronger pre-conditions while implying weaker post-conditions than those stated above. Therefore, the k-zero day metrics used herein may yield a conservative network security result. Results may also be conservative in embodiments wherein one zero day vulnerability is assigned to each component of a network, because in reality a component may have more vulnerabilities (note that a more conservative result of a metric is one that requires fewer zero day vulnerabilities). In some embodiments, a network may have more than one k-zero day metric number. As described below, k-zero day metric numbers may be calculated for individual targets within a network from an origin or origins. Different targets may be relatively easier or harder to reach from different origins and may have different k-zero day metric numbers. A target may be any element of a network which may be subject to an attack, such as a condition, privilege, machine, or other element. Likewise, an origin may be any element of a network from which an attack can be started, such as a condition, privilege, machine, or other element.

FIG. 1 depicts a network 100 according to an embodiment of the invention. In this example network 100, a first host 110 provides an HTTP service (http) and a secure shell service (ssh), and a second host 120 provides ssh. The first host 110 and second host 120 may be able to communicate with one another behind a firewall 130. The firewall 130 may allow traffic to and from the first host 110, but only allow connections to the second host 120 that originate from the second host 120. A remote computer 140 may exist outside the firewall 130. The remote computer may only communicate with the first host 110 and second host 120 if allowed by the firewall 130 or by exploiting one or more network vulnerabilities.

Figure 2A:
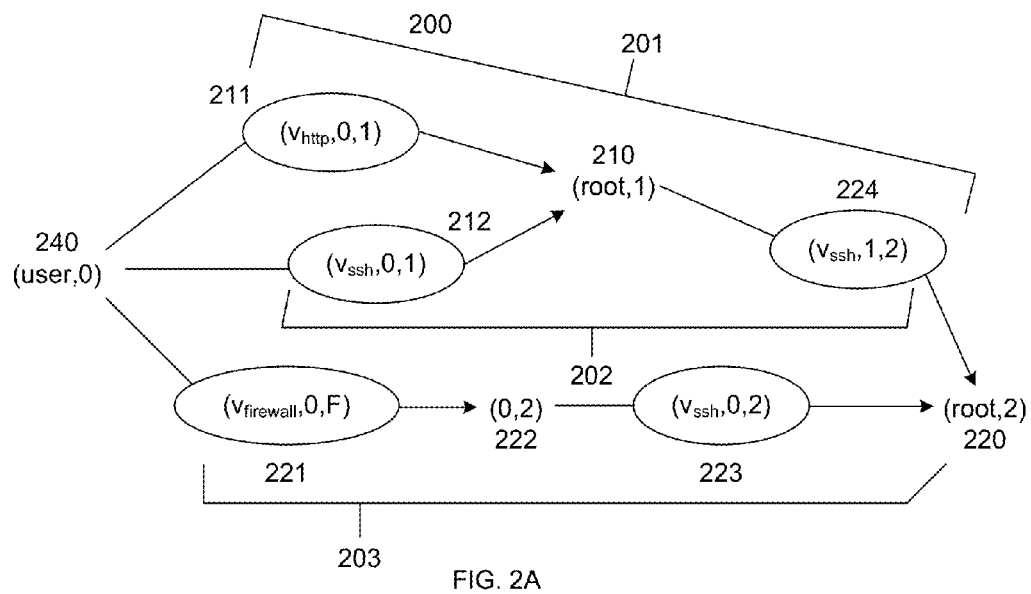
FIG. 2A depicts a network according to an embodiment of the invention.

FIG. 2A depicts a network 200 according to an embodiment of the invention. In this example, the remote computer 140 of FIG. 1 is attempting to access the first host 110 and second host 120 by exploiting network vulnerabilities, and the target of the attack is a root privilege 220 on the second host 120. FIG. 2A shows three sequences 201, 202, and 203 of zero day attacks leading to the root privilege 220 of interest. Within the sequences 201, 202, and 203, each numeric pair denotes a condition and each triple inside oval denotes the exploitation of a zero day vulnerability. In the first sequence 201 or second sequence 202, an attacker 240 on a remote computer 140 may exploit a zero day vulnerability in either http 211 or ssh 212, respectively, on the first host 110 to obtain the root privilege 210 for the first host 110. Using the first host 110 as a stepping stone, the attacker 240 may exploit a zero day vulnerability in ssh 224 on the second host 120 to reach the target root privilege 220. In the third sequence 203, the attacker 240 may exploit a zero day vulnerability 221 in the firewall 130 (e.g., a weak password in the firewall's 130 web-based remote administration interface) to reestablish a blocked connection 222 to the second host 120 and then exploit an ssh vulnerability 223 on the second host 120. In this example, the network can resist at most one zero day attack, since the second sequence 202 only requires one unique zero day vulnerability in ssh 212 and 224 for both first 110 and second 120 hosts.

Figure 2B:
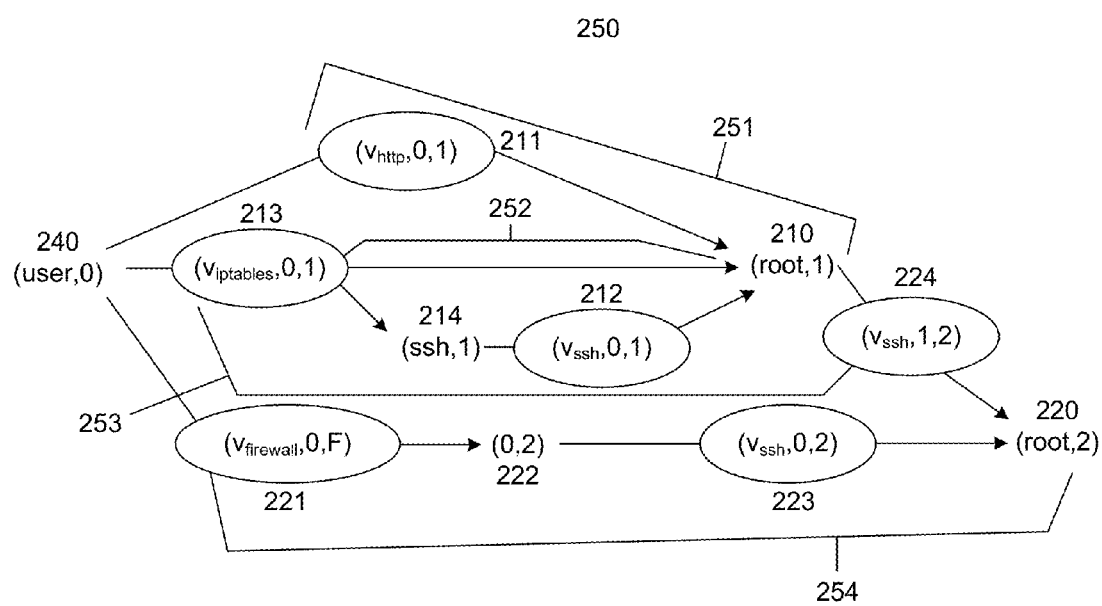
FIG. 2B depicts a network according to an embodiment of the invention.

FIG. 2B depicts a network 250 according to an embodiment of the invention. In this example, the remote computer 140 of FIG. 1 is attempting to access the first host 110 and second host 120 by exploiting network vulnerabilities, and the target of the attack is a root privilege 220 on the second host 120. The vulnerabilities of FIG. 2B are similar to those of FIG. 2A, except that iptables 213 have been added. The iptables 213 may only allow specific computers to connect to ssh 212 of the first host 110, not including the remote computer 140 and its associated attacker 240. FIG. 2B shows four sequences 251, 252, 253, and 254 of zero day attacks leading to the root privilege 220 of interest. The first sequence 251 is similar to the first sequence 201 of FIG. 2A, and the fourth sequence 254 is similar to the third sequence 203 of FIG. 2A. In the second sequence 252, the attacker 240 may exploit a zero day vulnerability in iptables 213 to obtain the root privilege 210 on the first host 110, and then the attacker 240 may exploit a zero day ssh vulnerability 224 to obtain the root privilege 220 on the second host 120. In the third sequence 253, the attacker 240 may exploit a zero day vulnerability in iptables 213 to connect to ssh 214 on the first host 110, and then the attacker 240 may exploit a zero day ssh vulnerability 212 to obtain the root privilege 210 on the first host 110, and finally the attacker 240 may exploit a zero day ssh vulnerability 224 to obtain the root privilege 220 on the second host 120. All four sequences 251, 252, 253, and 254 now require two distinct zero day vulnerabilities. The hardening effort of adding iptables may allow the network to resist one more zero day attack. The hardened network can thus be considered relatively more secure, since the likelihood of having more zero day vulnerabilities available at the same time, in the same network, and exploitable by the same attacker, may be lower. Therefore, the number of distinct zero day vulnerabilities can be used to measure the relative security risk of different networks, which may otherwise be indistinguishable.

The examples of FIGS. 2A and 2B may represent simplified systems relative to some systems which may be evaluated. For example, it is assumed that ssh on the first host 110 and the second host 120 both correspond to the same zero day vulnerability, which is not necessarily true. Similarly, exploiting http and ssh may not necessarily lead to the root privilege 220. Known vulnerabilities, which may interact with zero day vulnerabilities, are not considered. Also, an insider attack may directly give attackers a privilege without any zero day vulnerability. It will be understood by those of ordinary skill that the examples of FIGS. 2A and 2B are not intended to represent the full range of vulnerabilities and complexities present in various networks. Modeling and calculating k-zero day safety, as described below, may be performed for simple examples such as the examples of FIGS. 2A and 2B and/or more complicated examples such as those which may be found in existing and future computer networks.

Remote services and network connectivity may be identified by examining hosts' configurations. A network scanning may be insufficient to determine k-zero day safety in some embodiments, since it may only reveal services or connectivity currently disabled by security services (e.g., ssh behind iptables). Therefore, some embodiments may utilize a model which includes data about the existence, instead of the current reachability, of a service or host.

Figure 3:
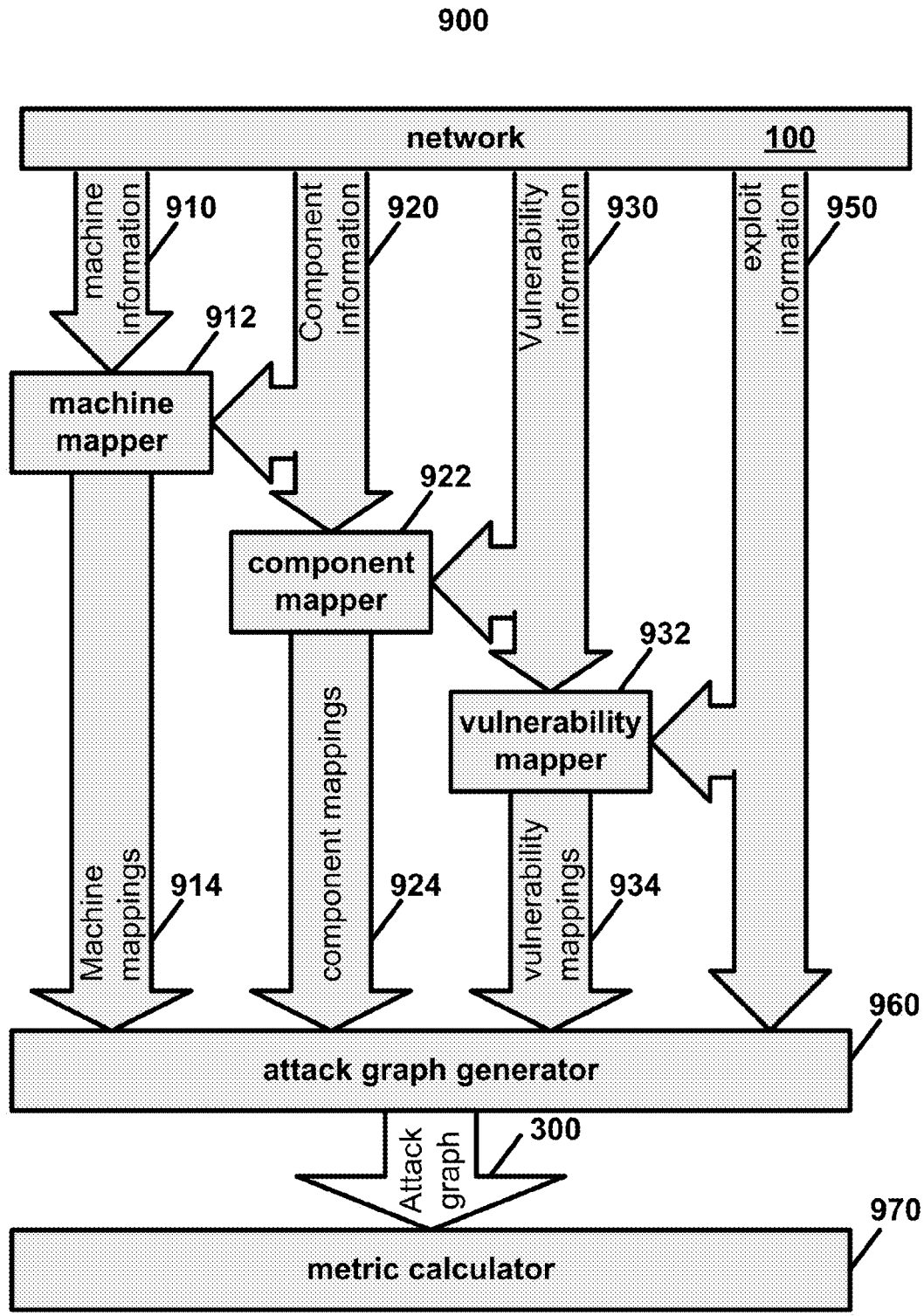
FIG. 3 depicts a block diagram of a model generation according to an embodiment of the invention.

FIG. 3 depicts a block diagram of a model generation process 900 according to an embodiment of the invention. Determination of a k-zero day safety metric for a network may be based on an abstract model of network elements. Examples of methods and systems for generating network models may be found in U.S. Pat. No. 7,904,962, entitled "Network Attack Modeling, Analysis, and Response," the entirety of which is incorporated by reference herein. The process 900 of FIG. 3 is similar to processes taught in U.S. Pat. No. 7,904,962. To generate a model, the process 900 may analyze a network 100 to determine what elements are present on the network 100, gathering machine information 910, component information 920, vulnerability information 930, and exploit information 950. Machine information 910 may identify hardware elements of the network 100, component information 920 may identify components on the network 100 which may be attacked, vulnerability information 930 may identify known vulnerabilities as well as locations where zero day vulnerabilities may exist, and exploit information 950 may include data about possible exploits of vulnerabilities.

The process 900 may map at least one machine to at least one component using network 100 machine information 910 and/or component information 920 and a module such as a machine mapper 912. The result may be a set of machine mappings 914. The mapping of machines to components may include at least one application of at least one corrective measure on a selective basis. A component mapper 922 may use network 100 component information 920 and/or vulnerability information 930 to map at least one of the components to at least one vulnerability. The result may be a set of component mappings 924. A vulnerability mapper 934 may use network 100 vulnerability information 930 and/or exploit information 950 to map at least one vulnerability to at least one exploit, resulting in vulnerability mappings 934. Exploits may include at least one precondition mapped to at least one postcondition. An attack graph 300 may be generated using at least one of the exploits 950 using an attack graph generating module 960. The attack graph 300 be used by a metric calculator 970 as a network model for calculating k-zero day safety. Attack graphs 300 are described in greater detail with respect to FIG. 4 below. A metric calculator 970 may be a computer that may be constructed and arranged to perform processes such as those shown in FIGS. 6-8 below.

In the following discussion, an example model for a network is presented. Table 1 provides a listing of notations which are used in the model. Further details about the terms in Table 1 will be provided in the explanation of the example model.

TABLE 1

| | |
|---|---|
| H, h | A set of hosts, a host |
| S, s | A set of services, a service |
| P, p | A set of privileges, a privilege |
| serv(.) | Services on a host |
| priv(.) | Privileges on a host |
| conn | Connectivity |
| $v_s, v_p$ | Zero day vulnerability |
| $(v_x, h, h')$ | Zero day exploit |
| pre(.), post(.) | Pre and post conditions |
| G | Zero day attack graph |
| $C_I$ | Initial conditions |
| $e_1, e_2, \ldots, e_j$ | Attack sequence |
| A | Assets |
| seq(a) | Attack sequences compromising a |
| $\equiv_v$ | Relation of non-distinct exploits |
| k0d(.) | The k-zero day safety metric |

In some embodiments, a network model (which may be generated using the process of FIG. 3) may comprise several elements. For example, the following elements may be present:

H, S, and P, which denote the network's sets of hosts (computers and networking devices), services, and privileges, respectively.

serv(.): $H \rightarrow 2^S$ and priv(.): $H \rightarrow 2^P$, which denote functions that map each host to a set of services and privileges, respectively.

$conn \subseteq H \times H$, which denotes a connectivity relation between elements.

In the model, hosts may include networking devices (for example firewalls, routers, etc.) because such devices may be vulnerable to zero day attacks, and a compromised device may enable access to blocked services. Note that hosts, services, and privileges may all be components that may be vulnerable to attack.

A component (such as a service) in the model may be remotely accessible over the network, in which case it may be called a remote component, or a component may be used to disable a remote component or network connection, in which case it may be called a security component. The example model does not include components that can only be exploited locally for a privilege escalation (modeling such applications may not be feasible at all considering that an attacker may install his/her own applications after obtaining accesses to a host). On the other hand, the example model includes remote components and connectivity currently disabled by security components, since the former may be re-enabled through zero day attacks on the latter (e.g., ssh behind iptables in FIG. 2B).

In the model, privileges may include those under which components are running and those that can potentially be obtained through a privilege escalation. Including the latter may enable modeling of the strength of isolation techniques (e.g., sandboxing or virtual machines) that may prevent such an escalation.

Returning to FIG. 2B, an example model for the network 250 may be as follows:

H={0,1,2,F} (F denotes the firewall)

conn={(0,F),(0,1),(0,2),(1,F),(1,0),(1,2),(2,F),(2,0),(2,1)} ((0,2) is included since it can be enabled by a zero day attack on the firewall)

serv(1)={http,ssh,iptables}, serv(2)={ssh}, and serv(F)={firewall} (firewall is a security service and it may disable connection (0,2))

priv(1)=priv(2)={user,root}.

Even if vulnerability-specific properties, such as likelihood and severity, are not assumed, generic properties common to most vulnerabilities may be assumed for zero day vulnerabilities. For example, the zero day exploit of a privilege may act as a placeholder when isolation techniques are modeled below. A zero day exploit may be modeled as follows:

For each $h \in H$ and $x \in (serv(h) \cup priv(h))$, denote by $v_x$ a zero day vulnerability. A zero day exploit is the triple:

$(v_s,h,h')$ where $(h,h') \in conn$ and $s \in serv(h')$, or $(v_p,h,h)$ where $p \in priv(h)$.

Unlike an exploit of a known vulnerability which may have unique pre- and post-conditions, all zero day exploits may share the same hard-coded conditions described above. A zero day exploit of each security service may have additional post-conditions, which may indicate that the exploit will reenable disabled conditions. For zero day exploits of a privilege, the pre-conditions may include the privilege of every service, since it may be assumed that a zero day exploit may potentially yield any privilege. Conditions may be modeled as follows:

Denote by $E_0$ the set of all zero day exploits, $C_0$ the set of conditions $(conn \cup \{(x,h): h \in H, x \in serv(h) \cup priv(h)\})$, and define functions pre(.): $E_0 \rightarrow C_0$ and post(.): $E_0 \rightarrow C_0$ as:

$pre((v_s,h,h'))=\{(h,h'),(s,h'),(p_{min},h)\}$ for each $s \in serv(h)$, where $p_{min}$ is the least privilege on h $pre((v_p,h,h))=\{p_s: s \in serv(h), p_s \neq p\}$ for each $p \in priv(h)$ $post((v_s,h,h'))=\{p_s\}$ for each remote service s with privilege $p_s$ $post((v_s,h,h'))=\{p_s\} \cup C_s$ for each security service s, where $C_s$ is the set of conditions disabled by s $post((v_p,h,h))=\{(p,h)\}$ for each $p \in priv(h)$.

Figure 4:
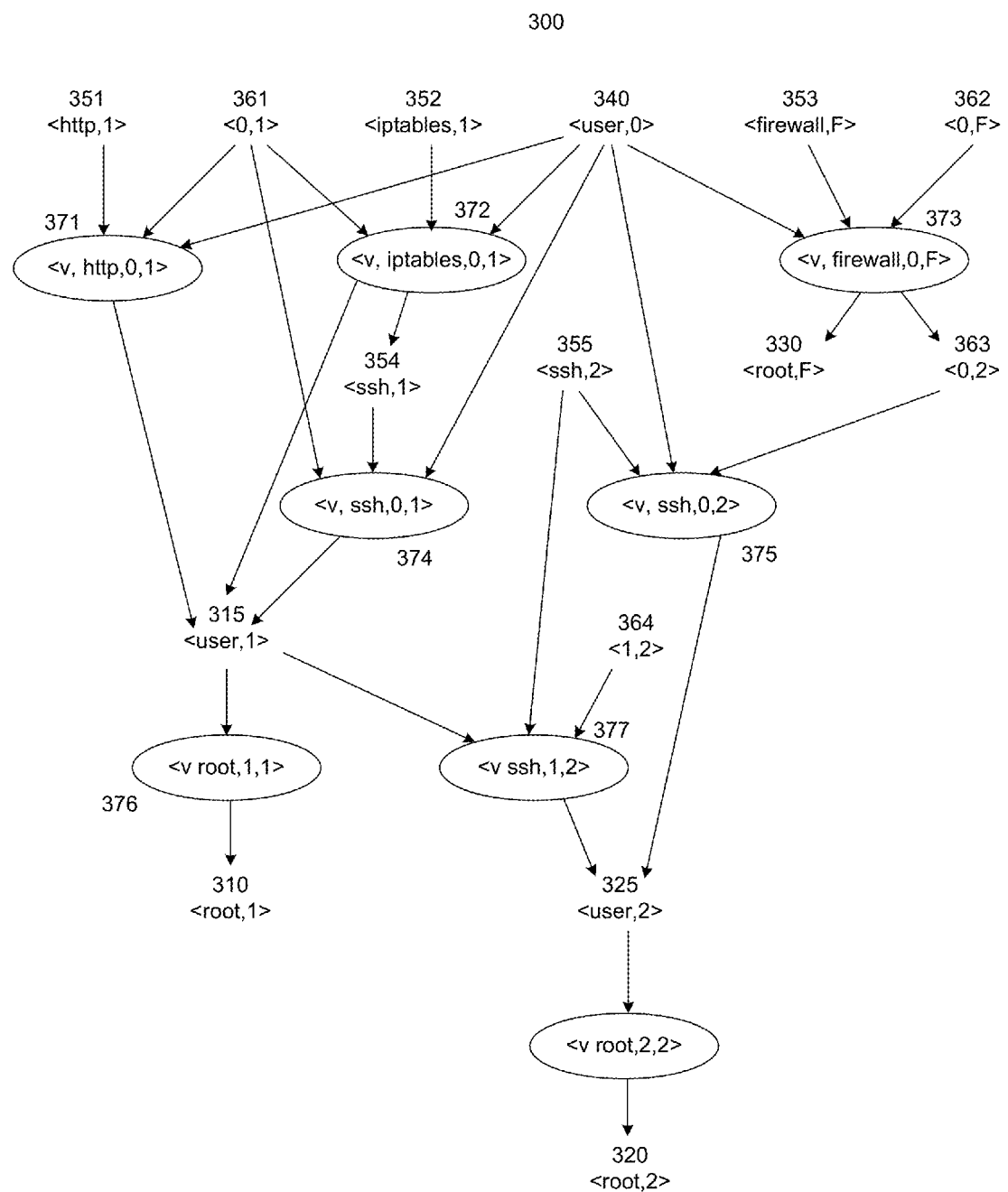
FIG. 4 depicts a zero day attack graph according to an embodiment of the invention.

FIG. 4 depicts an example zero day attack graph 300 according to an embodiment of the invention. Attack graphs 300 may be generated for any target (or targets) and from any origin (or origins). Like the examples of FIGS. 2A and 2B, the target is <root, 2> and the origin is <user, 0> in this example. There may be several origins of paths of vulnerabilities that may be exploited to eventually lead to one or more targets. By relating exploits of known vulnerabilities and zero day exploits through common pre- and post-conditions, a zero day attack graph 300 such as that of FIG. 4 may be composed. Each numeric pair 310-364 denotes a condition and each triple inside an oval 371-378 denotes the exploitation of a zero day vulnerability. Numeric pairs 315, 325, 340-364 having arrows pointing to exploitations 371-378 may be preconditions for exploitations 371-378 to which they point. Numeric pairs 310-330, 354, 363 to which arrows from exploitations 371-378 point may be postconditions for exploitations 371-378. Note that some numeric pairs 315, 325, 354, 363 may be preconditions for some exploitations 371-378 and postconditions for others. Also, numeric pairs 315, 325, 340, 355, 361 may be either pre- or postconditions for more than one exploitation 371-378. In a zero day attack graph, exploits of known vulnerabilities may be considered as shortcuts that help attackers to satisfy a condition with less zero day exploits. Therefore, exploits of known vulnerabilities may be trust relationships, misconfigured applications, or some other type of vulnerability, as long as they may provide a shortcut for bypassing zero day exploits. A zero day attack graph may be generated as follows:

Given a set of exploits of known vulnerabilities $E_1$ and their pre- and post-conditions $C_1$, let $E=E_0 \cup E_1$, $C=C_0 \cup C_1$, and extend pre(.) and post(.) to $E \rightarrow C$ (as the union of relations). The directed graph $G=(E \cup C, \{(x,y): (y \in E \wedge x \in pre(y)) \vee (x \in E \wedge y \in post(x))\})$ may be a zero day attack graph.

In some embodiments a zero day attack graph may be generated as described above, or using some other formula, instead of being obtained by injecting zero day exploits into an existing attack graph of known vulnerabilities. This is because some unreachable exploits may be discarded in generating an attack graph of known vulnerabilities, whereas such exploits may indeed serve as shortcuts for bypassing zero day exploits in a zero day attack graph.

One or more initial conditions may be associated with a zero day attack graph. Initial conditions may serve at least two purposes. First, initial conditions may include all conditions that are not post-conditions of any exploit. Second, initial conditions may also include conditions that may be satisfied as the result of insider attacks or user mistakes. The effects of such attacks or mistakes may be modeled as the capability of satisfying post-conditions of an exploit without first executing the exploit. An attack sequence may be defined as a total order, which means multiple attack sequences may correspond to the same set of partially ordered exploits. The logical connectives $\wedge$, $\vee$, and $\neg$ may model cases where multiple conditions must be satisfied to cause damage (e.g., the availability of a file with multiple backups on different hosts), cases where satisfying at least one condition will cause damage (e.g., the confidentiality of the aforementioned file), and cases where conditions are not to be satisfied during an attack (for example, conditions that will trigger an alarm), respectively. An asset value may be the relative weight of independent assets. Initial conditions, attack sequences, and assets may be determined according to the following, given a zero day attack graph G.

The set of initial conditions is given as any $C_I \subseteq C$ satisfying $CI \supseteq \{c:(\forall e \in E)(c \notin post(e))\}$.

An attack sequence is any sequence of exploits $e_1, e_2, \ldots, e_j$ satisfying $(\forall i \in [1,j])(\forall c \in pre(e_i))$ $(c \in C_I) \vee (\exists x \in [1, i-1] c \in post(e_x))$ An asset a is any logical proposition composed of conditions and the logical connectives $z, 25, z, \approx$, and $\neg$ for which an asset value $v(a)$ is given through a function $v(.): A \rightarrow [0, \infty)$ where A denotes the set of all assets Define a function $seq(.): A \rightarrow 2^Q$ as $seq(a)=\{e_i, e_2, e_j: a \in post(e_j)\}$ where Q denotes the set of all attack sequences The zero day attack graph of FIG. 4 may correspond to the network of FIG. 2B. If insider attacks and/or user mistakes are not considered, the following attack sequences may compromise the asset (root,2) 320:
1. (vhttp,0,1) 371, (vssh,1,2) 377, (vroot,2,2) 378
2. (viptables,0,1) 372, (vssh,1,2) 377, (vroot,2,2) 378
3. (viptables,0,1) 372, (vssh,0,1) 374, (vssh,1,2) 377, (vroot, 2,2) 378
4. (vfirewall,0,F) 373, (vssh,0,2) 375, (vroot,2,2) 378

If insider attacks on the first host 110 are considered, the following sequence may also compromise the asset 320:
5. (vssh,1,2) 377, (vroot,2,2) 378

If a different asset (root,1) $\wedge$ (root,2) 310, 320 is considered, then sequences 1-3 above (but not 4-5) may compromise the asset 310, 320.

Note that some of the attack sequences above have different origins. A k-zero day analysis may consider some or all origins in an attack graph when determining a safety level. In some cases, multiple zero day exploits may be counted as a single exploit. This may be incorporated into a model using the relation $\equiv_v$. The relation $\equiv_v$ may be defined as follows:

Define a relation $\equiv_v \subseteq E_0 \times E_0$ such that $e \equiv_v e'$ indicates either e and e' are exploits of the same zero day vulnerability, or $e=(v_s,h_1,h_2)$, $e'=(v_p,h_2,h_2)$ and exploiting s yields p. Say e and e' are distinct if $e \equiv_v e'$.

One example of a case wherein two or more exploits are only counted once may be when multiple exploits involve the same zero day vulnerability. Another example may be when the exploit of a service is related to the exploit of a privilege such that the service exploit will directly yield the privilege due to the lack of isolation between the two. In some cases, a probability may be associated with relation $\equiv_v$ to indicate a degree of similarity or isolation between the multiple exploits it relates. If a probability is associated with a relation that probability need not necessarily be incorporated into a model, so that the effect of the relation on a final metric will not be affected.

Given a plurality of sets of zero day exploits, the function k0d(.) may count how many exploits cannot be related through $\equiv_v$. In particular, if one of the sets is empty, then the function k0d(.) may yield the number of distinct zero day exploits in the other set. When a probabilistic approach is adopted in defining the relation $\equiv_v$, the function k0d(.) can be revised to give an expected value (mean). A metric function k0d(.) may be defined as follows.

Define a function $k0d(.): 2^{E0} \times 2^{E0} \rightarrow [0, \infty]$ as $k0d(F,F')= \max(\{|F''|:F'' \subseteq (F \Delta F'), (\forall e_1, e_2 \in F'')(e_1 \equiv_v e_2)\})$ where $|F''|$ denotes the cardinality of F'', max(.) denotes the maximum value in a set, and $F \Delta F'$ denotes the symmetric difference (that is, $(F \backslash F') \cup (F' \backslash F)$).

A function k0d(a) may be a metric useful to determine a minimum number of distinct zero day exploits required to compromise an asset, set of assets, or network α. This can be proven according to the following:

For all F, F', F'' $\subseteq E_0$, the following hold:
1. k0d(F,F')=0 iff F=F': This is straightforward since k0d(F, F')=0 iff FDF'=Ø, and the latter is equivalent to F=F'
2. k0d(F,F')=k0d(F',F): This property is satisfied by the symmetric difference.
3. k0d(F,F')+k0d(F',F'')≥k0d(F,F''): Denote by tmp(G) the function $\max(\{|G'|: G' \subseteq G, \forall e_1, e_2 \in Gi (e_i \equiv_v e_2)\})$. First, the symmetric difference satisfies the triangle inclusion relation $F \Delta F'' \subseteq (F \Delta F') \cup (F' \Delta F'')$. So, $tmp((F \Delta F') \cup (F' \Delta F'')) \geq tmp(F \Delta F'')$ holds. Next, it may only need to be shown $tmp(F \Delta F')+tmp(F' \Delta F'') \geq tmp((F \Delta F') \cup (F' F''))$ is true. It may suffice to show the function tmp(.) to be sub-additive, that is, $tmp(G)+tmp(G') \geq tmp(G \cup G')$ holds for any $G,G' \subseteq E_0$. This follows from the fact that if the relation e e' holds for any $e, \equiv e' \in G$ (or $e, e' \in G'$), it also holds in $G \cup G'$ (the converse is not necessarily true).

The metric k0d(.) may be applied to assets, sets of assets, and/or networks. For example, k0d(a) may indicate the minimum number of distinct zero day exploits required to compromise a (which may be an asset, set of assets, network, and/or another component or element of interest). This number may be unique for each asset, although multiple attack sequences may compromise the asset. The metric may be applied to a set of independent assets by taking a weighted average with asset values as the weight. Finally, by applying the metric to all components within a network, a measurement of a network's resistance to potential zero day attacks may be obtained. This analysis may be performed as follows:

Given a zero day attack graph G, a set of initial conditions $C_I$, and a set of assets A:

for any a∈A, use k0d(a) for min({k0d(q∩$E_0$,∅): q∈seq(a)}), where min(.) denotes the minimum value in a set and q stands for both a sequence and a set. For any k∈[0,k0d (a)), a is k-zero day safe.

Given any A'⊆A, k0d(A') for $\Sigma_{a \in A'}$(k0d(a)·v(a))/$\Sigma_{a \in A'}$v (a) may be used.

For any k∈[0,k0d(A')), A' is k-zero day safe. In particular, when A'=A, the network is k-zero day safe.

The empty set in the definition above may be interpreted as the conjunction of all initial conditions (which may be compromised without any zero day exploit).

FIG. 5 depicts a relation table 400 according to an embodiment of the invention. The relation table 400 may be associated with the example of FIG. 4. Returning to the example of FIG. 4, suppose all exploits of services involve distinct vulnerabilities except (vssh,0,1) 374, (vssh,1,2) 377, and (vssh, 0,2) 375. Assume ssh and http are not protected by isolation but iptables is protected. Then, the relation $\equiv_v$ may be shown by FIG. 5, wherein a 1 may indicate two exploits are related and a 0 may indicate that two exploits are not related (or, by adopting a probabilistic approach, these can be regarded as the probabilities associated with the relation $\equiv_v$).

Using a model established according to the processes described above or in some other way, k-zero day safety for the system represented by the model may be computed. For example, to compute the k-zero day safety of a network, a logic proposition of each asset in terms of exploits may be derived. Then, each conjunctive clause in a disjunctive normal form (DNF) of the derived proposition may correspond to a minimal set of exploits that may jointly compromise the asset. The value of k may then be determined by applying the metric k0d(.) to each such conjunctive clause.

Figure 6:
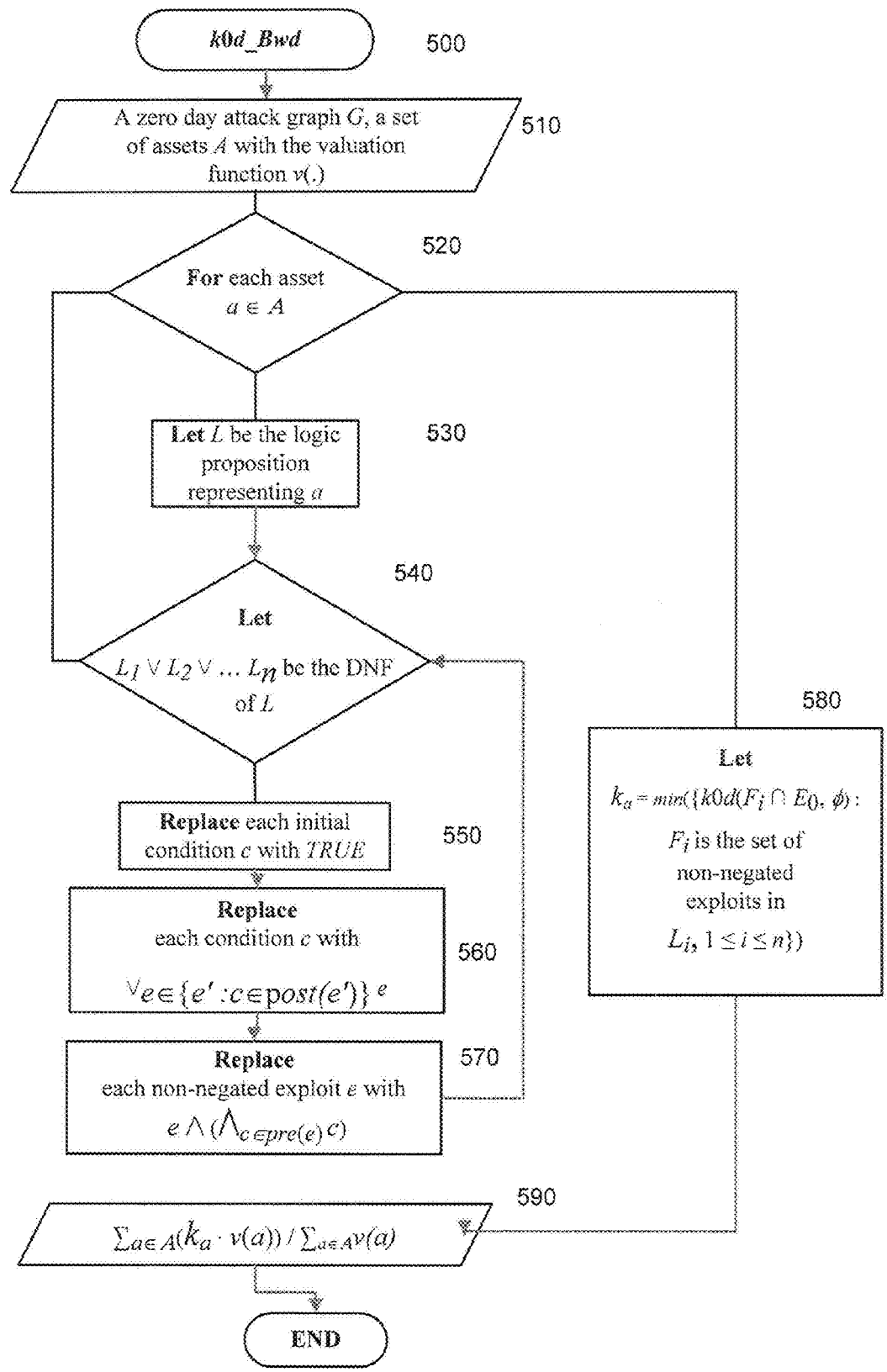
FIG. 6 depicts a k-zero day safety computation flow chart according to an embodiment of the invention.

FIG. 6 depicts a k-zero day safety computation flow chart according to an embodiment of the invention. A procedure such as k0d Bwd 500 shown in FIG. 6 may be applied to obtain a value of k. This procedure 500 is an example of a procedure that may determine the k-zero day safety for one or more assets. A zero day attack graph may be received 510. For each asset associated with the zero day attack graph, a∈A 520. L may be defined as the logic proposition representing a 530. For example, a zero day attack graph such as the one shown in FIG. 4 may be interpreted as a logic program by regarding each exploit or condition as a boolean variable and having a logic proposition c←. for each initial condition c, a proposition e←$\Lambda_{c \in pre(e)}$c for each pre condition relationship, and a set of propositions {c←e:c∈post(e)} for each post condition relationship. An inner loop may repetitively apply the aforementioned logic propositions to derive a formula by letting $L_1 \omega L_2 \omega \ldots L_n$ be the DNF of L 540, replacing each initial condition c with true 550, replacing each condition c with $\omega_{e \in \{e' : c \in post(e')\}}$ e 560, and replacing each non-negated exploit e with $e \supseteq (\neq_{c \in pre(e)} c)$ 570, until each c is considered. Note that a negated condition given in the asset may be replaced with the negation of exploits, and a negated condition may not be further processed. This is because in order not to satisfy a condition, it may suffice not to execute those exploits that have the condition as their post-condition (on the other hand, to satisfy a condition requires more actions). When a DNF is generated for each asset 540, k-zero day safety may be computed 580. The results of all iterations may be aggregated as the final output 590. Note that this example process omits the simplification of logic propositions using logic tautologies (such as e1 ⊇ ¬ 1≡false) and the handling of cycles in the attack graph by maintaining a set of predecessors for each visited node.

The procedure 500 of FIG. 6 may have a worst-case complexity that is exponential in the size of the zero day attack graph. For example, the complexity may be partially determined by the size of the derived proposition L and its DNF. Both may be exponential. Given a zero day attack graph, an asset a, and any non-negative integer k, the problem of finding an attack sequence q∈seq(a) that minimizes k0d(q∩$E_0$,∅) is NP-complete (wherein NP indicates nondeterministic polynomial time). The proof of this statement is as follows.

First, the problem is NP, since whether a given sequence of exploits q satisfies q∈seq(a)⊇k0d(q∩$E_0$,∅)=k may be determined in polynomial time in the size of the zero day attack graph. The NP-hard problem of finding the minimum attack (that is, an attack sequence with the minimum number of exploits) in an attack graph may be reduced to the current problem. The reduction cannot be trivially achieved by simply replacing each known exploit with a zero day exploit in a given attack graph of known exploits, because the zero day exploits may have a fixed number of hard-coded pre- and post-conditions that may prevent a zero day exploit from fitting in the position of a known exploit.

A zero day attack graph G' may be constructed by injecting a zero day exploit before each known exploit. Specifically, first let G'=G. Then, for each known exploit e of a service s from a source host $h_1$ to a different destination host $h_2$, a zero day exploit e' may be injected with the post-conditions {(s, $h_2$)$p_{useless}$} where $p_{useless}$ is a privilege designed not to be the pre-condition of any exploit (e' can be interpreted as exploiting a vulnerability in a security service, such as a personal firewall, that blocks accesses to the service s on $h_2$ from $h_1$). Then the following two statements may be true. First, executing e requires e' to be executed first; conversely, if e' needs to be executed, then the only reason must be to satisfy the condition (s,$h_2$) and consequently execute e. That is, any attack sequence in G' will include either both e and e', or neither e nor e'. Second, among the three conditions in pre(e')={(s',$h_2$),($h_1$,$h_2$),($p_{least}$,$h_1$)}, the first is an initial condition and the last two are also members of pre(e). Therefore, the injection of e' does not change the logical structure of the attack graph (more precisely, G and G' are isomorphic if e and e' are regarded as a single exploit and ignore the initial condition (s',$h_2$)).

Next, for each known exploit e involving the same source and destination host h, e may be replaced with a zero day exploit e' and a known exploit e" satisfying that post(e")=post (e), pre(e")=pre(e)\{(p,h)}∪{(p',h)} where (p,h)∈pre(e) and {(p',h)} are two privileges. Also, post(e')={(p',h)}, and the relation $\equiv_v$ may be designed such that e' is not related to any other zero day exploits in h through $\equiv_v$. Then the following two facts may be true. First, any attack sequence in G' will include either both e and e', or neither e nor e'. Second, the injection of e' does not change the logical structure of the attack graph.

Based on the above construction, given any asset a, for any attack sequence q'∈seq(a) in G', the known exploits in q also form an attack sequence q∈seq(a) in G(note that a will always be the post-condition of known exploits due to the above construction). Moreover, if $\equiv_v$ is designed in such a way that no two zero day exploits are related by $\equiv_v$, then |q|=k0d (q'∩$E_0$,∅). Therefore, for any non-negative integer k, finding q' in G' to minimize k0d(q'∩$E_0$,∅) will immediately yield q in G that also minimizes |q|, and the latter is essentially the minimum attack problem. This shows the former to be an NP-hard problem and concludes the proof.

Note that the intractability result above implies that a single algorithm may be unable to efficiently determine k for all possible inputs (that is, arbitrary zero day attack graphs) in some embodiments. However, efficient solutions may exist for practical systems. Examples of such solutions are presented in FIGS. 7 and 8 below.

Note that an extremely conservative assumption may yield a trivial result (e.g., no network is 1-zero day safe, if insider attacks are considered possible on every host). While such an assumption may be the safest, it may also be the least helpful in terms of improving network security since no improvement measures would be helpful.

Figure 7:
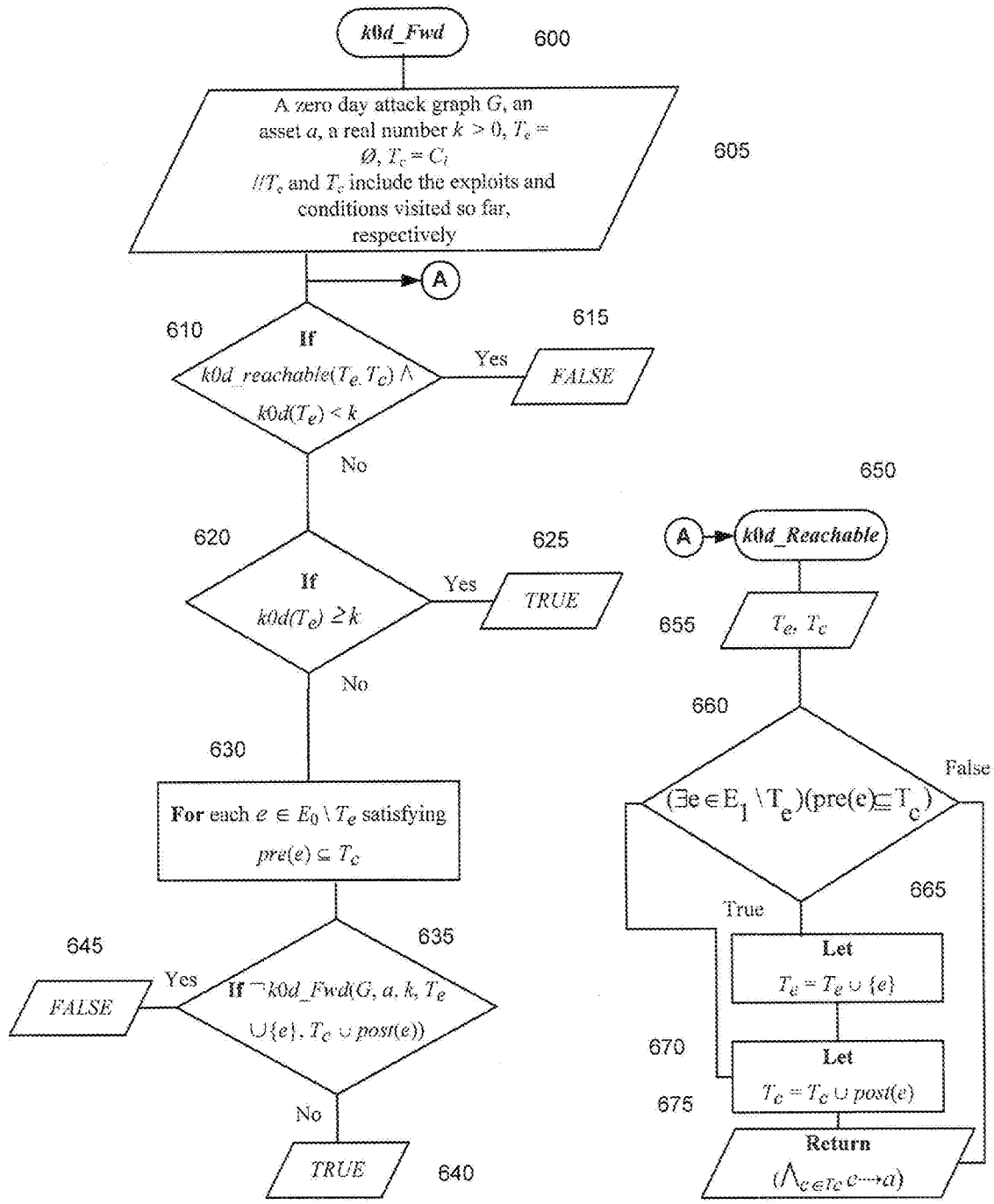
FIG. 7 depicts a k-zero day computation flow chart for a given k according to an embodiment of the invention.

FIG. 7 depicts a k-zero day computation flow chart for a given k according to an embodiment of the invention. For many practical purposes, it may suffice to know that every asset in a network is k-zero day safe for a given value of k, even though the network may in reality be k'-zero day safe for some unknown k'>k (for example, determining k' may be intractable as described above). In many other practical cases, it may suffice to know that a particular target (or targets) is k-zero day safe for a given value of k. In the example of FIG. 7, the solution's complexity is polynomial in the size of a zero day attack graph if k is a constant compared to this size. Attempts may be made compromise each asset with less than k distinct zero day exploits through a forward search of limited depth. The asset may not be k-zero day safe if any branch of the search succeeds, and vice versa.

Specifically, FIG. 7 shows a recursive procedure k0d Fwd 600 with two base cases and one recursive case. A zero day attack graph G, an asset a, and a real number k may be input 605. $T_e$ and $T_c$ in FIG. 7 may indicate the exploits and conditions visited so far, respectively. In the first base case, the procedure may determine whether asset a can be compromised with less than k distinct zero day exploits in $T_e$ 610 and may return FALSE when it can 615. In the second base case, the procedure may determine whether the set $T_e$ already has more than k distinct zero day exploits 620 (regardless of whether a can be satisfied with $T_c$) and may return TRUE when it can 625. A sub-procedure k0d Reachable 650 may expand Te with all reachable known exploits 655 since they do not count in terms of the k0d(.) metric. The main procedure may enter the recursive case only when $T_e$ includes less than k distinct zero day exploits and a cannot be satisfied with $T_c$. The main procedure may iteratively visit each zero day exploit e reachable from $T_c$ 630, and may starts a recursive search from e 635. If no such e exists, the procedure may return TRUE indicating the end of a sequence is reached 640. If any branch of the search succeeds, FALSE may be recursively returned to indicate a is not k-zero day safe 645.

Figure 8A:
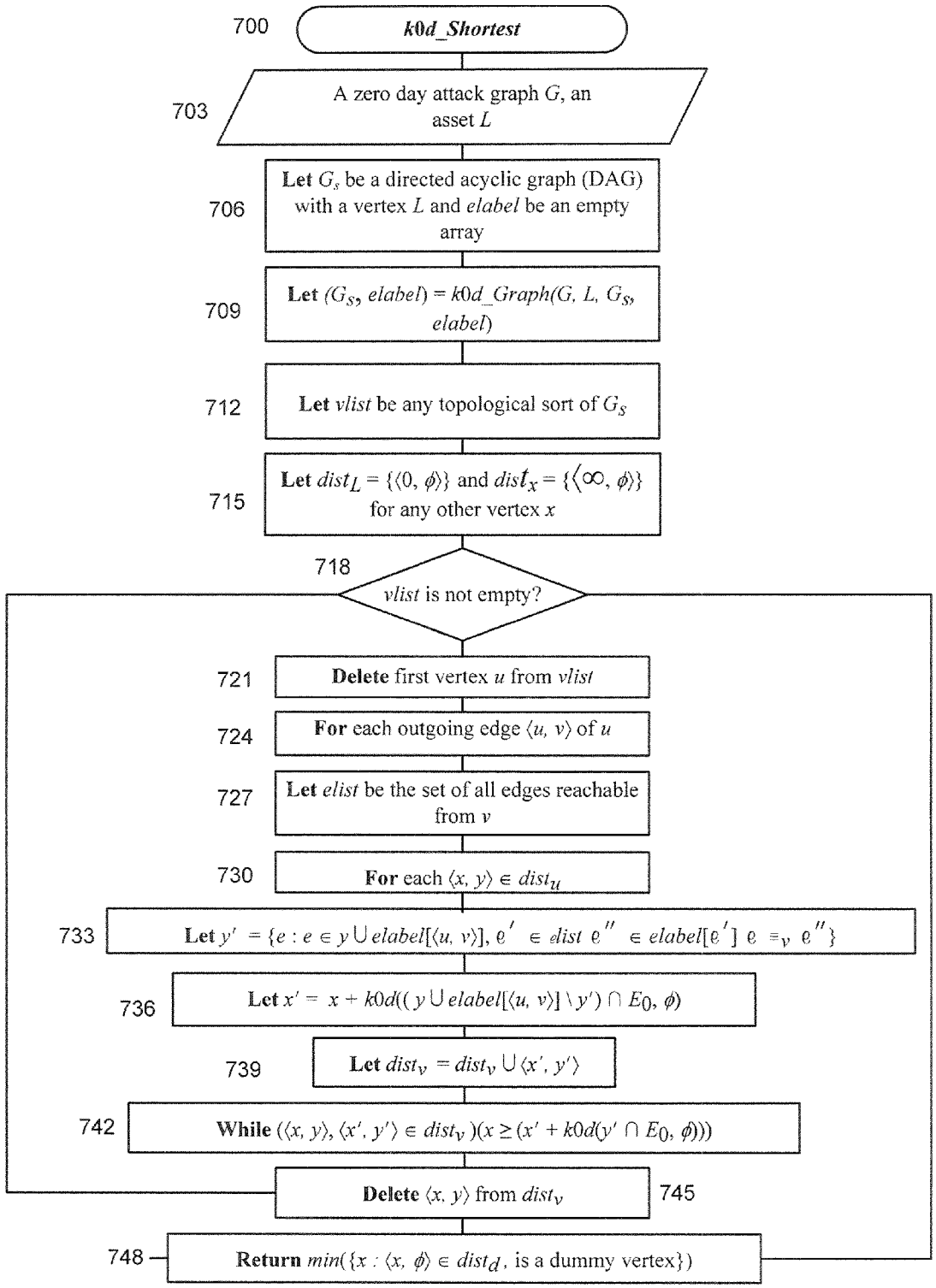
FIGS. 8A and 8B depict a flow chart for finding shortest paths in a directed acyclic graph according to an embodiment of the invention.
Figure 8B:
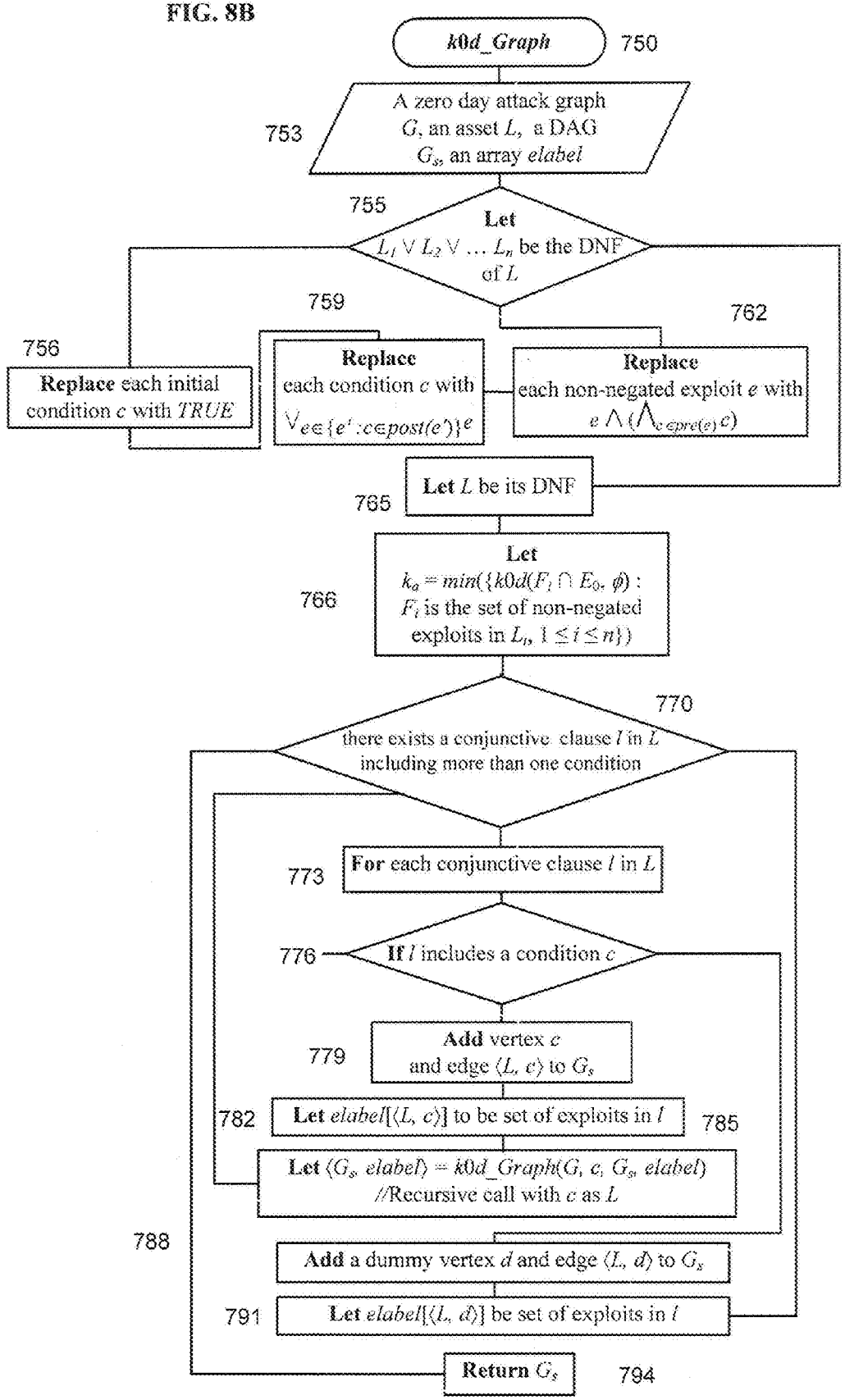

FIGS. 8A and 8B depict a flow chart for finding shortest paths in a directed acyclic graph (DAG) according to an embodiment of the invention. Even if it is intractable to compute k for arbitrary zero day attack graphs, efficient solutions may exist for those satisfying special properties. In this example, two assumptions may be made. First, most exploits will only require one condition on the remote host (e.g., when a host is only used as a stepping stone, the condition could be a user privilege on that host). Second, zero day exploits will be distinct unless they are on the same or adjacent hosts.

The first assumption may imply that a logical proposition may be derived (as in procedure k0d Bwd above) separately for each host. In the resultant DNF, each conjunctive clause may include at most one condition involving a remote host, which means the asset can be expressed as a disjunction of conditions (without considering exploits). The same reasoning may be repeated by regarding each such condition as an asset on the involved remote host. Since the relationships between all conditions are now disjunctive, each condition may be regarded as the vertex of a DAG (recall that cycles will be avoided) with their disjunctive relationships as edges, and exploits in the same conjunctive clause as edge weights.

In the weighted DAG, determining the value of k may amount to finding the shortest path along which the function k0d(.) applied to all zero day exploits will yield the minimum value. During a backward search, two parts may comprise a distance for each edge. Those zero day exploits that may later be related to others through $\equiv_v$ may be kept in a set since the function k0d(.) can not yet be applied. For other exploits, the result value of applying k0d(.) may be kept. The second assumption above may ensure that the first part of the edge distance will not grow quickly. The shortest distance can then be obtained using a standard algorithm, taking polynomial time (more precisely, the complexity is shown to be $|H|^4 \cdot |E_0|$ as described below).

In FIG. 8A, procedure k0d Shortest 700 may provide a specific example of a method for finding shortest paths in a DAG. In FIG. 8B, sub procedure k0d Graph 750 may be used to build a DAG based on a given zero day attack graph and asset.

The main procedure 700 may imitate a standard algorithm for finding the shortest path in a DAG. More specifically, a zero day attack graph and asset may be defined 703. A DAG may be generated 706, 709, and vertices of the DAG may be processed based on a topological sort 712. The distance of the source vertex may be initialized as 0, and the distance of other vertices may be initialized as infinity 715. Each vertex may be processed 718. Upon processing a vertex 721, each of its neighbors 724 may be updated with potentially shorter distances via the current vertex. The following modifications to the standard shortest distance algorithm may take into account zero day exploits related by $\equiv_v$. First, instead of a single number, each distance may now be a set of pairs (x,y), where x denotes the result of applying k0d(.) to exploits that will not later be related to others by $\equiv_v$, and y denotes the set of zero day exploits that may later be related to others. More than one pair may be used to define a distance. Second, reachable edges may be collected in order to determine whether an exploit may later be related to others by $\equiv_v$ 727. Third, instead of simply calculating the minimum distance, both parts of each distance pair may be computed based on the distance of current vertex and the edge weight 733, 736. The new distance pair may then be added 739. Finally, after all distance pairs are added, the set of distance pairs may be examined 742 to remove those that cannot be the minimum distance even when considering the effect of relation $\equiv_v$ 745. Finally, the minimum shortest distance from the asset to a dummy vertex (representing initial conditions) may be returned as the result k 748.

Turning to the sub-procedure 750, a zero day attack graph, an asset, a DAG, and an array may be entered 753. A logical proposition of the asset in terms of exploits and conditions may be derived 766 using the same statements as in procedure k0d Backward 755, 756, 759, 762, 765 as described above. This derivation may stop whenever the DNF of the logic proposition includes at most one condition in each conjunctive clause 770. The sub-procedure 750 then may add each such conjunctive clause to the result DAG by regarding each condition as a vertex pointed to by the asset 773, 776, 779, and the set of exploits in the same conjunctive clause as the edge weight 782. The sub-procedure 750 may recursively expand on each such condition 785. If a conjunctive clause does not include a condition (meaning that only initial conditions are required) 776, a dummy vertex may be added to represent the collection of deleted initial conditions 788, 791. Finally, $G_s$ may be returned 794.

Figure 9:
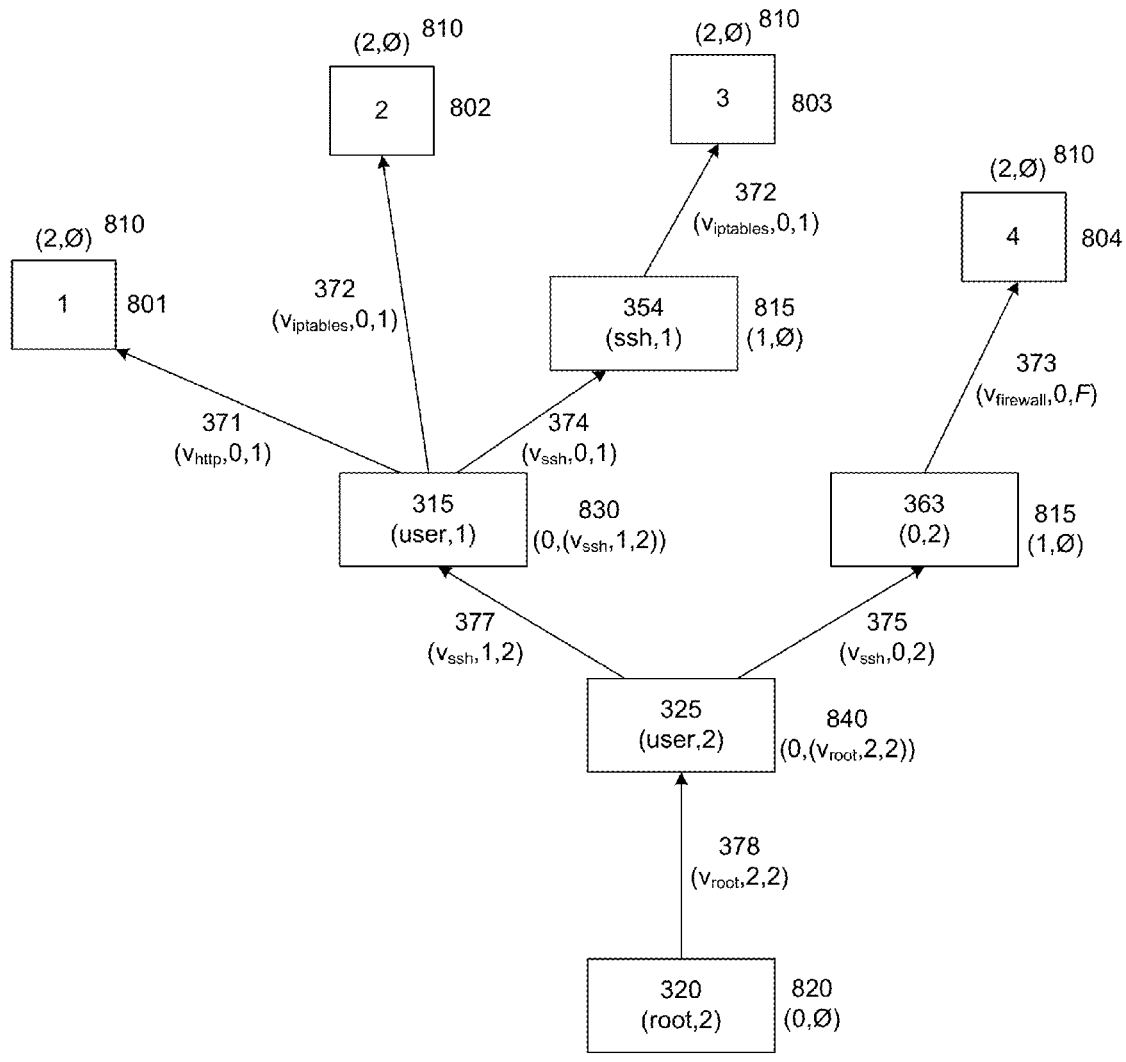
FIG. 9 depicts a directed acyclic graph according to an embodiment of the invention.

FIG. 9 depicts a DAG 800 according to an embodiment of the invention. The execution of procedures k0d shortest 700 and k0d graph 750 may be used to generate a DAG 800. The DAG 800 may be a DAG for a scenario corresponding to the scenario of FIG. 4 above with respect to <root,2> 320, and may in fact be a compliment of FIG. 4. Each edge is labeled with the edge weight elabel 810-840 (which may correspond to a vulnerability, for example) and each vertex is labeled with the distance dist 371-378 (which may correspond to a component, for example). The complexity of the procedure may depend on how well the aforementioned assumptions hold on a given zero day attack graph. First, the complexity of sub-procedure k0d graph 750 may be exponential in the number of exploits and conditions involved in the first loop 755-765 of FIG. 8B. Therefore, if the first assumption perfectly holds, this loop 755-765 may always terminate after processing a single host. If the number of exploits and conditions on each host is constant, then the complexity of the sub-procedure may be linear in the number of hosts (that is, a constant time may be required for deriving and processing L for each host). Second, the complexity of the main procedure may depend on the size of the distance of each vertex. If the second assumption holds perfectly such that each distance has a negligible size, then the complexity of the main procedure may be dominated by processing the reachable edges in elist and their labels elabel 733 as shown in FIG. 8A. Since each edge in $G_s$ may be visited exactly once by the main loop and the size of elist may be linear in the number of such edges, the processing of elist may take quadratic time in the number of edges in $G_s$, which may be roughly $O(|H|^4)$ (by the first assumption, each host may correspond to a constant number of vertices in $G_s$). Finally, multiplying this by the size of elabel, the complexity $|H|4 \cdot E0|$ may be obtained.

K-zero day safety determinations may have many uses. For example, determining k-zero day safety for a target may enable network hardening to make a target k-zero day safe for a larger k. For example, consider unfolding k based on the following model:

$$k = k0d(A) = \Sigma_{a \in A}(k0d(a) \cdot v(a))/\Sigma_{a \in A} v(a) \quad (1)$$

$$k0d(a) = \min(\{k0d(q \cap E_0, \emptyset) : q \in \text{seq}(a)\}) \quad (2)$$

$$k0d(q \cap E_0, \emptyset') = \max(\{|F| : F \subset q \cap E_0, (\forall e_1, e_2 \in F)(e_1 \equiv_v e_2)\}) \quad (3)$$

$$\text{seq}(a) = \{e_1, e_2, \ldots, e_j : a \in \text{post}(e_j), \quad (4)$$

$$(\forall i \in [1,j])(\forall c \in \text{pre}(e_i))(c \in C_I) \vee (\exists x \in [1, i-1]/c \in \text{post}(e_x))\}. \quad (5)$$

For example, it may be possible to increase k by:

Increasing services' diversity to have more distinct exploits in equation (3).

Strengthening isolation techniques to have more distinct exploits in equation (3).

Disabling initial conditions (e.g., removing a service or a connection) in CI to yield longer attack sequences in line (5) (part of equation (4)).

Enforcing more strict access control policies to lessen the risk of insider attacks or user mistakes (thus removing conditions from CI in line (5)).

Protecting assets with backups (conjunction of conditions) and detection efforts (negation of conditions) to yield a longer sequence in equation (4).

Introducing more security services to regulate accesses to remote services for a longer sequence in equation (4).

Patching known vulnerabilities such that fewer shortcuts for bypassing zero day exploits yield a longer sequence in equation (4).

Prioritizing the above options based on the asset values in equation (1) and shortest attack sequences in equation (2).

Some of the aforementioned hardening options are known by those of ordinary skill in the art, and other known or unknown hardening techniques may also increase k. Regardless of which hardening techniques are used, a k-zero day safety determination may quantify their effectiveness. More effective hardening techniques may yield a larger k. In addition to hardening applications, k-zero day safety day determinations may have other uses. For example, an owner or administrator of a cloud network or other service may be able to attract customers by demonstrating a large k for their systems and therefore a high degree of network security.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above-described embodiments In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A method for securing a network vulnerable to attack from at least one origin to at least one target, the network including at least one machine having a plurality of components, the method comprising:

(i) causing a present security of the network to be determined, wherein the present security of the network is indicated by a safety level of the network, wherein the safety level is determined by:

associating, with a computer, the at least one machine with the plurality of components, the plurality of components comprising an origin component and a target component;

associating, with the computer, each of the plurality of components with at least one of a plurality of vulnerabilities; generating, with the computer, an attack graph describing exploitation of each of the plurality of vulnerabilities, the attack graph defining exploit condition relationships between the origin component and the target component;

analyzing, with the computer, the attack graph using a k-zero day metric function based on a number of distinct zero day exploits required to compromise the target component in an attack starting from the origin component; and determining, with the computer, the safety level based on the analysis of the attack graph using the k-zero day metric function; and (ii) causing hardening to be performed on the network based on the determined safety level.

2. The method of claim 1, wherein:

the analyzing of the attack graph comprises determining a minimum number of distinct zero day exploits required to compromise the target component by iteratively applying the k-zero day metric function to the attack graph for each of the plurality of vulnerabilities to determine a minimum number of exploitable vulnerabilities required to compromise the target component; and the safety level comprises a minimum number of distinct zero day exploits required to compromise the target component.

3. The method of claim 1, wherein:

the analyzing of the attack graph comprises determining whether the target component is unable to be compromised by a specific number of distinct zero day exploits by analyzing the attack graph using a k-zero day metric function to determine whether any number of vulnerabilities required to compromise the target component is less than the specific number; and the safety level comprises an indication whether the target component is unable to be compromised by the specific number of zero day exploits.

4. The method of claim 1, wherein each of the plurality of components is any unit of computational processing that can contribute to a network attack vulnerability.

5. The method of claim 1, further comprising generating with the computer a visual presentation of at least part of the attack graph.

6. The method of claim 1, wherein the network is a cloud network.

7. A computer system, comprising:

a computer constructed and arranged to determine a safety level of an original network vulnerable to attack from at least one origin to at least one target, the original network including at least one machine having a plurality of components, the computer comprising: a processor constructed and arranged to:

associate the at least one machine with the plurality of components, the plurality of components comprising an origin component and a target component;

associate each of the plurality of components with at least one of a plurality of vulnerabilities;

generate an attack graph describing exploitation of each of the plurality of vulnerabilities, the attack graph defining exploit condition relationships between the origin component and the target component;

analyze the attack graph using a k-zero day metric function based on a number of distinct zero day exploits required to compromise the target component in an attack starting from the origin component; and determine a safety level based on the analysis of the attack graph using the k-zero day metric function; and a hardened network created by performing hardening on the original network based on the determined safety level.

8. The computer of claim 7, wherein:

the processor is constructed and arranged to analyze the attach graph by determining whether the target component is unable to be compromised by a. specific number of distinct zero day exploits by analyzing the attack graph using a k-zero day metric function to determine whether any number of vulnerabilities required to compromise the target component is less than the specific number; and the safety level comprises an indication whether the target component is unable to be compromised by the specific number of zero day exploits.

9. The computer of claim 7, wherein:

the processor is constructed and arranged to analyze the attack graph by determining whether the target component is unable to be compromised by a specific number of distinct zero day exploits by analyzing the attack graph using a k-zero day metric function to determine whether any number of vulnerabilities required to compromise the target component is less than the specific number; and the safety level comprises an indication whether the target component is unable to be compromised by the specific number of zero day exploits.

10. The computer of claim 7. wherein each of the plurality of components is any unit of computational processing that can contribute to a network attack vulnerability.

11. The computer of claim 7, further comprising:

a display;

wherein the processor is further constructed and arranged to generate a visual representation of at least part of the attack graph and output the visual representation to the display.

12. The computer of claim 7, wherein the original network is a cloud network.

13. The computer of claim 7, wherein:

the processor is in communication with the original network; and the processor is further constructed and arranged to scan the original network to gather data about the at least one machine, the plurality of components, and/or the at least one of the plurality of vulnerabilities.

14. The computer of claim 7, wherein;

the processor is in communication with the original network; and the processor is further constructed and arranged to receive data via the original network about the at least one machine, the plurality of components, and/or the at least one of the plurality of vulnerabilities.

15. A computer network system, comprising:

a hardened network created by performing hardening on an original network based on a safety level of the original network, the original network being vulnerable to attack from at least one origin to at least one target, the original network including at least one machine having a plurality of components, wherein the safety level is determined by:

associating, with a computer, the at least one machine with plurality of components, the plurality of components comprising an origin component and a target component;

associating, with the computer, each of the plurality of components with at least one of a plurality of vulnerabilities;

generating, with the computer, an attack graph describing exploitation of each of the plurality of vulnerabilities, the attack graph defining exploit condition relationships between the origin component and the target component;

analyzing, with the computer, the attack graph using a k-zero day metric function based on a number of distinct zero day exploits required to compromise the target component in an attack starting from the origin component; and determining, with the computer, the safety level based on the analysis of the attack graph using the k-zero day metric function.

16. The computer network system of claim 15, wherein:
the analyzing or the attack graph comprises determining a minimum number of distinct zero day exploits required to compromise the target component by iteratively applying the k-zero day metric function to the attack graph for each of the plurality of vulnerabilities to determine a minimum number of exploitable vulnerabilities required to compromise the target component; and
the safety level comprises a minimum number of distinct zero day exploits required to compromise the target component.

17. The computer network system of claim 15, wherein:
the analyzing, of the attack graph comprises determining whether the target component is unable to be compromised by a specific number of distinct zero day exploits by analyzing the attack graph using a k-zero day metric function to determine whether any number of vulnerabilities required to compromise the target component is less than the specific number; and
the safety level comprises an indication whether the target component is unable to be compromised by the specific number of zero day exploits.

18. The computer network system of claim 15, wherein each of the plurality of components is any unit of computational processing that can contribute to a network attack vulnerability.

* * * * *